(12) United States Patent
Shannon et al.

(10) Patent No.: US 11,154,904 B2
(45) Date of Patent: Oct. 26, 2021

(54) ACOUSTIC SOURCES FOR AIR DATA SYSTEMS

(71) Applicant: Rosemount Aerospace Inc., Burnsville, MN (US)

(72) Inventors: Daniel W. Shannon, Glastonbury, CT (US); Karen A. Teerlinck, Monson, MA (US); Joseph V. Mantese, Ellington, CT (US); Jaime Sly, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 200 days.

(21) Appl. No.: 16/158,894

(22) Filed: Oct. 12, 2018

(65) Prior Publication Data

US 2021/0293845 A1   Sep. 23, 2021

(51) Int. Cl.
| | |
|---|---|
| *G01N 29/07* | (2006.01) |
| *G01N 29/34* | (2006.01) |
| *G01H 5/00* | (2006.01) |
| *G01P 5/24* | (2006.01) |
| *B06B 1/06* | (2006.01) |
| *G10K 13/00* | (2006.01) |

(Continued)

(52) U.S. Cl.
CPC ............. *B06B 1/06* (2013.01); *G01H 5/00* (2013.01); *G01N 29/07* (2013.01); *G01N 29/34* (2013.01); *G01P 5/24* (2013.01); *G01N 2291/011* (2013.01); *G01P 13/025* (2013.01); *G10K 9/122* (2013.01); *G10K 13/00* (2013.01)

(58) Field of Classification Search
CPC .......... G01P 5/14; G01P 21/025; G01P 5/245; G01P 5/24; H04R 3/12; B06B 1/06; G01H 5/00; G01N 29/07; G01N 29/34; G10K 11/02; G10K 13/00; G10K 9/122
USPC .......................................................... 73/602
See application file for complete search history.

(56) References Cited

U.S. PATENT DOCUMENTS

| | | |
|---|---|---|
| 3,120,756 A | 2/1964 | Knausenberger |
| 3,139,617 A | 6/1964 | Denman et al. |
| 3,548,653 A | 12/1970 | Cory |

(Continued)

FOREIGN PATENT DOCUMENTS

| | | | |
|---|---|---|---|
| EP | 2152980 A1 | | 2/2010 |
| EP | 002202525 | * | 6/2010 |

(Continued)

OTHER PUBLICATIONS

Extended European search report issued in corresponding EP application No. 19202182.2, dated Mar. 10, 2020.

*Primary Examiner* — Jacques M Saint Surin
(74) *Attorney, Agent, or Firm* — Locke Lord LLP; Daniel J. Fiorello; Gabrielle L. Gelozin

(57) ABSTRACT

An ultrasonic air data system (UADS) can include a body configured to mount to an aircraft, an acoustic signal shaping feature associated with the body, and an acoustic source operatively connected to the acoustic signal shaping feature, the acoustic source configured to emit a directional acoustic signal. The acoustic signal shaping feature can be configured to reshape the directional acoustic signal from the acoustic source into an at least partially reshaped signal. The system can include one or more acoustic receivers disposed on or at least partially within the body for receiving the reshaped signal.

6 Claims, 1 Drawing Sheet

(51) Int. Cl.
*G10K 9/122* (2006.01)
*G01P 13/02* (2006.01)

(56) References Cited

U.S. PATENT DOCUMENTS

| | | | |
|---|---|---|---|
| 4,031,756 A | 6/1977 | Rotier et al. | |
| 4,112,756 A | 9/1978 | MacLennan et al. | |
| 5,185,728 A * | 2/1993 | Gilchrist | G10K 9/122 |
| | | | 181/175 |
| 5,548,657 A * | 8/1996 | Fincham | H04R 1/24 |
| | | | 381/182 |
| 5,585,557 A | 12/1996 | Loschke et al. | |
| 5,979,234 A * | 11/1999 | Karlsen | G01P 5/245 |
| | | | 73/170.13 |
| 7,155,969 B2 | 1/2007 | Drutowski et al. | |
| 7,530,266 B2 | 5/2009 | Tillotson et al. | |
| 8,261,609 B2 | 9/2012 | Choisnet et al. | |
| 9,121,860 B1 * | 9/2015 | Cronyn | G01P 3/00 |
| 9,612,252 B2 * | 4/2017 | Waddington | G01P 5/24 |
| 9,779,713 B2 | 10/2017 | Blanc et al. | |
| 9,796,479 B2 * | 10/2017 | Tucker | B64D 45/00 |
| 9,812,117 B1 | 11/2017 | Mantese et al. | |
| 10,006,928 B1 * | 6/2018 | Hagerott | G01P 13/025 |
| 2011/0261652 A1 * | 10/2011 | Horsky | B06B 1/0253 |
| | | | 367/97 |
| 2012/0078540 A1 * | 3/2012 | McIntyre | G01P 13/025 |
| | | | 702/50 |
| 2012/0204647 A1 * | 8/2012 | Kimura | G01S 7/521 |
| | | | 73/597 |
| 2014/0098971 A1 * | 4/2014 | Kadar | H04R 3/12 |
| | | | 381/80 |
| 2017/0356773 A1 | 12/2017 | Lowe et al. | |
| 2019/0346279 A1 * | 11/2019 | Sly | G01P 13/025 |
| 2020/0110110 A1 * | 4/2020 | Matheis | G01P 21/025 |

FOREIGN PATENT DOCUMENTS

| | | | |
|---|---|---|---|
| EP | 2753954 A1 | | 7/2014 |
| FR | 002948458 | * | 1/2011 |
| FR | 2974908 | * | 11/2012 |
| WO | 2008150718 | | 12/2008 |
| WO | 2013036284 | | 3/2013 |

* cited by examiner

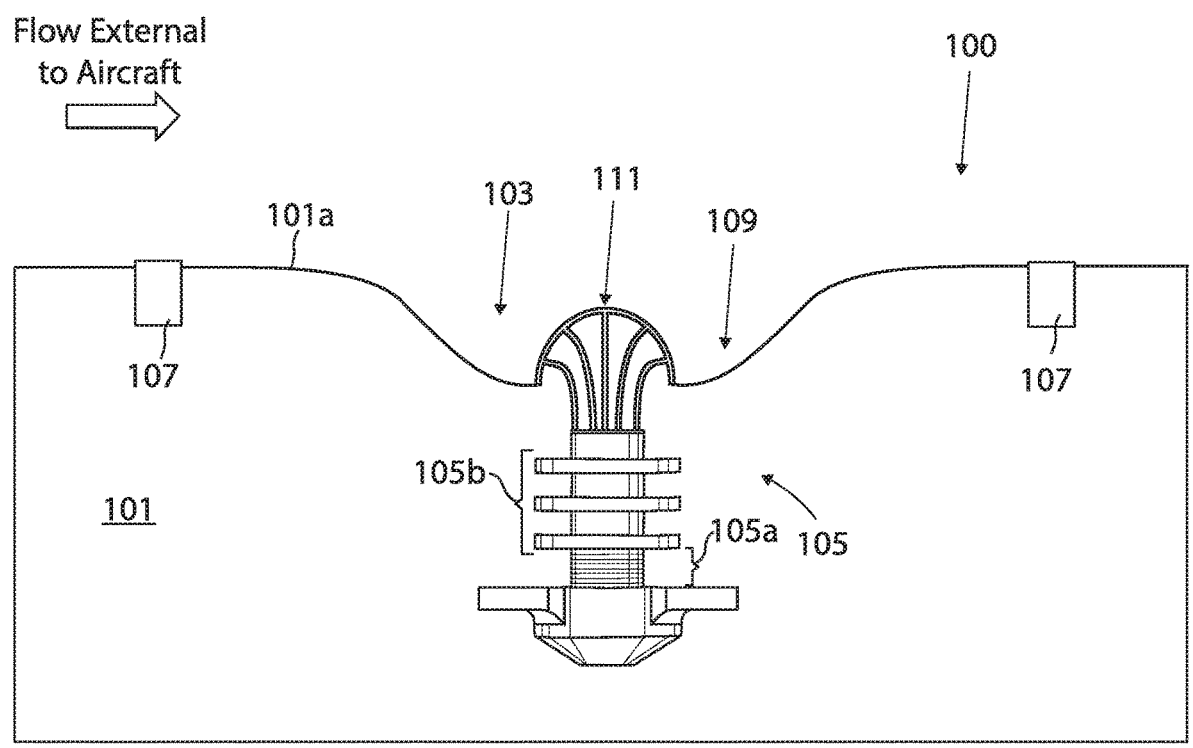

ACOUSTIC SOURCES FOR AIR DATA SYSTEMS

BACKGROUND

1. Field

The present disclosure relates to air data systems, more specifically to acoustic sources for air data systems, e.g., ultrasonic air data systems (UADS).

2. Description of Related Art

Certain SASAR (Sound Amplification through the Synchronous Accumulation of Radiation) acoustic sources create high amplitude acoustic vibrations using a combination of a resonating stack and a metamaterial gate, but are directional sources. Ultrasonic air data systems can utilize an acoustic signal to measure freestream velocity, flow angle, and speed of sound, for example, using the transmission time between an acoustic source(s) and acoustic receivers. Existing acoustic sources provide limited amplitude and directivity. Further, high frequencies attenuate quickly in air (and there's a large acoustic impedance mismatch to air), and in certain applications there is a high background noise environment, e.g., at high aircraft speeds. In view of the above, there is still a need in the art for acoustic sources for air data systems. The present disclosure provides a solution for this need.

SUMMARY

An ultrasonic air data system (UADS) can include a body configured to mount to an aircraft, an acoustic signal shaping feature associated with (e.g., defined in and/or attached to) the body, and an acoustic source operatively connected to the acoustic signal shaping feature, the acoustic source configured to emit a directional acoustic signal. The acoustic signal shaping feature can be configured to reshape the directional acoustic signal from the acoustic source into an at least partially reshaped signal. The system can include one or more acoustic receivers disposed on or at least partially within the body for receiving the reshaped signal.

The acoustic source can be a SASAR acoustic source. For example, the SASAR acoustic source can include a generator configured to generate the acoustic signal, and a gate configured to selectively pass the acoustic signal. Any other suitable source, directional or otherwise, is contemplated herein.

The acoustic signal shaping feature can include a waveguide recessed from an outermost surface of the body. The waveguide can include any suitable shape (e.g., a bowl or speaker shape).

In certain embodiments, the acoustic signal shaping feature can include a horn operatively connected to the acoustic source. The horn can be disposed in the waveguide such that it does not protrude past the outer most surface of the body. Any other suitable configuration is contemplated herein.

The one or more acoustic receivers can be disposed in the body at the outermost surface of the body. Any other suitable location for the acoustic receivers is contemplated herein.

A method can include shaping a directional acoustic signal emitted by an acoustic source of an air data system to be a reshaped acoustic signal. The method can include emitting the directional acoustic signal. In certain embodiments, the acoustic source can include a SASAR acoustic source.

In certain embodiments, emitting the directional acoustic signal can include emitting a pulse from the SASAR acoustic source (e.g., for time of flight measurement). In certain embodiments, emitting the directional acoustic signal can include emitting a constant acoustic signal (e.g., for phase measurement of signal).

The method can include receiving the reshaped acoustic signal at one or more acoustic receivers. The method can include determining air data based on a time-of-flight of the reshaped signal between the acoustic source and the one or more acoustic receivers.

In accordance with at least one aspect of this disclosure, an ultrasonic air data system can include a SASAR acoustic source configured to output an acoustic signal, and one or more acoustic receivers configured to receive the acoustic signal.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic diagram of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. The systems and methods described herein can be used to, e.g., provide high amplitude acoustic signals to receivers of an air data system.

Referring to FIG. 1, an ultrasonic air data system (UADS) 100 can include a body 101 configured to mount to an aircraft (not shown). The system 100 can include an acoustic signal shaping feature 103 associated with (e.g., defined in and/or attached to) the body 101.

An acoustic source 105 can be operatively connected to the acoustic signal shaping feature 103. The acoustic source 103 can be configured to emit a directional acoustic signal. The acoustic signal shaping feature 103 can be configured to reshape the directional acoustic signal from the acoustic source 105 into an at least partially reshaped signal (e.g., a hemisphere, a partial toroid, a cone, square, etc.). In certain embodiments, the feature 103 can be configured to optimally reshape the direction acoustic signal for improved functionality of the UADS 100. The optimal shape can be determined by one having ordinary skill in the art without undue experimentation. Any suitable reshaping is contemplated herein.

As shown, the acoustic source 105 can be a SASAR acoustic source. For example, the acoustic source 105 can include a generator 105*a* (e.g., comprising a piezoelectric stack that can build/resonate a high amplitude signal) configured to generate the acoustic signal, and a gate 105*b* configured to selectively pass the acoustic signal (e.g., in pulses after build up of, e.g., about 10 milliseconds to about 25 milliseconds). The SASAR acoustic source can include any suitable design, e.g., as appreciated by those having ordinary skill in the art, and any suitable controller/energy source (e.g., having any suitable hardware and/or software) to control the SASAR source. Any other suitable source, directional or otherwise, is contemplated herein.

The acoustic signal shaping feature 103 can include a waveguide 109 recessed from an outermost surface 101a of the body 101. The waveguide 109 can be or include any suitable shape (e.g., a bowl or speaker shape as shown).

In certain embodiments, the acoustic signal shaping feature 103 can be or include a horn 111 operatively connected to the acoustic source 105. The horn 111 can be disposed in the waveguide 109 such that it does not protrude past the outer most surface 101a of the body 101. The horn 111 can be connected to the gate 105b of the acoustic source 105 to receive the acoustic signal and at least partially reshape the acoustic signal (e.g., through resonation of the horn 111).

The horn 111 can include any suitable shape (e.g., a dome shape having a solid resonant body and/or having one or more channels) as appreciated by those having ordinary skill in the art in view of this disclosure. Any other suitable configuration is contemplated herein.

The horn 111 and/or waveguide 109 can be designed to match the impedance of air. Any other configuration is contemplated herein.

The system 100 can include one or more acoustic receivers 107 disposed on or at least partially within the body 101 for receiving the at least partially reshaped signal. As shown, the one or more acoustic receivers 107 can be disposed in the body 101 at the outermost surface of the body. Any other suitable location for the acoustic receivers 107 is contemplated herein.

A method can include shaping a directional acoustic signal emitted by an acoustic source (e.g., 105) of an air data system (e.g., 100) to be a reshaped acoustic signal (e.g., hemispherical or any other suitable shape). The method can include emitting the directional acoustic signal. In certain embodiments, the acoustic source 105 can include a SASAR acoustic source (e.g., which vibrates vertically and produces a vertically directed acoustic signal pulse).

In certain embodiments, emitting the directional acoustic signal can include emitting a pulse from the SASAR acoustic source (e.g., for time of flight measurement). In certain embodiments, emitting the directional acoustic signal can include emitting a constant acoustic signal (e.g., for signal phase measurement).

The method can include receiving the reshaped acoustic signal at one or more acoustic receivers. The method can include determining air data based on a time-of-flight of the reshaped signal between the acoustic source and the one or more acoustic receivers.

In accordance with at least one aspect of this disclosure, an ultrasonic air data system can include a SASAR acoustic source configured to output an acoustic signal, and one or more acoustic receivers configured to receive the acoustic signal.

The use of a directional, e.g., SASAR type, acoustic source in conjunction with an ultrasonic air data system is a unique technical combination. Embodiments can include one more sources combined with one or more acoustic receivers to measure the propagation time through the local flow field in the boundary layer on an aircraft. Embodiments can provide a loud and spherically propagating source not traditionally available. Existing sources are not sufficiently powerful to produce a reliable signal to noise ratio and/or are too directional and could not be used with an existing UADS.

Certain embodiments can provide higher amplitude ultrasonic source than currently available, pulse shaping of the acoustic wave, coupling with an acoustic horn that propagates the sound in a spherical or other optimal pattern, and use of multiple frequencies of SASAR stack resonance to allow for better air data for determining flow characteristics. Existing acoustic sources provide limited amplitude and directivity. A more powerful source like SASAR can be used for such an application to provide a stronger Signal to Noise Ratio.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An ultrasonic air data system, comprising:
   a body configured to mount to an aircraft;
   an acoustic signal shaping feature associated with the body;
   a SASAR acoustic source operatively connected to the acoustic signal shaping feature, the acoustic source configured to emit a directional acoustic signal, wherein the directional acoustic signal is a highly coherent beam, wherein the acoustic signal shaping feature is configured to reshape the directional acoustic signal from the acoustic source into an at least partially reshaped signal; and
   one or more acoustic receivers disposed on or at least partially within the body for receiving the reshaped signal.

2. The system of claim 1, wherein the SASAR acoustic source includes a generator configured to generate the acoustic signal, and a gate configured to selectively pass the acoustic signal.

3. The system of claim 1, wherein the acoustic signal shaping feature includes a waveguide recessed from an outermost surface of the body.

4. The system of claim 3, wherein the acoustic signal shaping feature includes a horn operatively connected to the acoustic source.

5. The system of claim 4, wherein the horn is disposed in the waveguide such that it does not protrude past the outer most surface of the body.

6. The system of claim 1, wherein the one or more acoustic receivers are disposed in the body at the outermost surface of the body.

\* \* \* \* \*